Oct. 4, 1932.  E. C. SPARLING  1,880,992

SUPPORT FOR GYROCOMPASSES

Filed Nov. 9, 1929

INVENTOR
Eric C. Sparling.
BY
his ATTORNEY.

Patented Oct. 4, 1932

1,880,992

UNITED STATES PATENT OFFICE

ERIC C. SPARLING, OF GARDEN CITY, NEW YORK, ASSIGNOR TO SPERRY GYROSCOPE COMPANY, INC., OF BROOKLYN, NEW YORK, A CORPORATION OF NEW YORK

SUPPORT FOR GYROCOMPASSES

Application filed November 9, 1929. Serial No. 405,887.

This invention relates to supporting means for gyroscopic compasses or other heavy direction indicating instruments. It is the present practice to support such instruments by a plurality of inclined radial springs to relieve the instrument of sudden jars and shocks. In such instruments, however, it is just as important to have the lubber line of the instrument aligned with the fore and aft center line of the ship and to maintain it there as to have the compass itself accurate, for all readings are taken with reference to the lubber's line. For accurate work, I find that the usual spring suspension is not satisfactory, since the varying tension of the springs may permit the compass to turn in its binnacle slightly so as to become permanently displaced with respect to the fore and aft line of the ship. Also, where there is much vibration from the ship's engines, the compass may tend to bounce up and down erratically, twisting first one way and then another in its binnacle and thus giving false readings of the compass. This is especially true on destroyers. To overcome these defects, I provide means for preventing displacement of the compass lubber line in azimuth with respect to the support but permitting free up and down movement of the compass upon its spring support.

Referring to the drawing in which the preferred form of the invention is shown;

Figure 1:
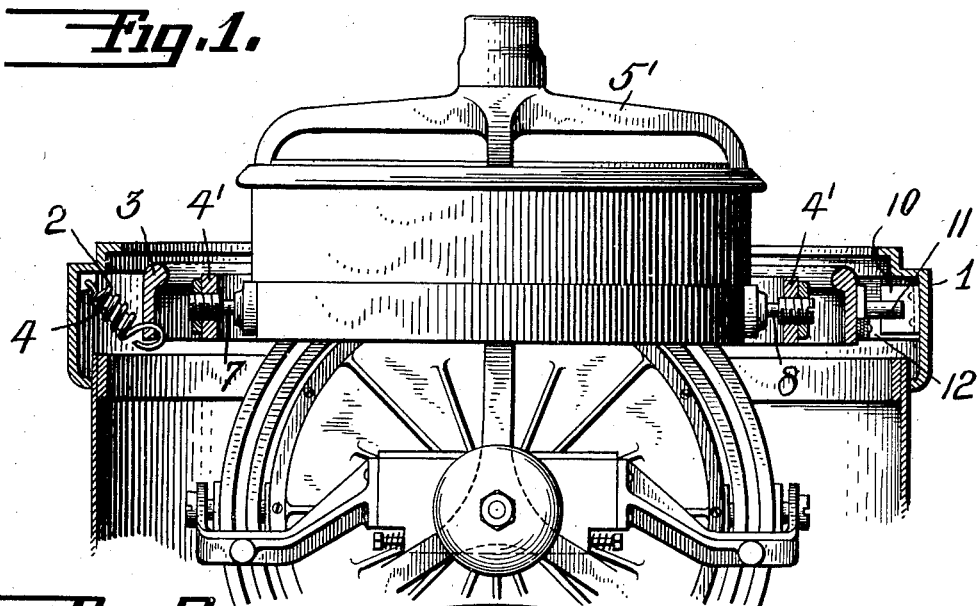
Fig. 1 is a north elevation of the compass, partly in section, the section being taken through the outer support and gimbal rings on broken line 1—1 of Fig. 2.
Figure 2:
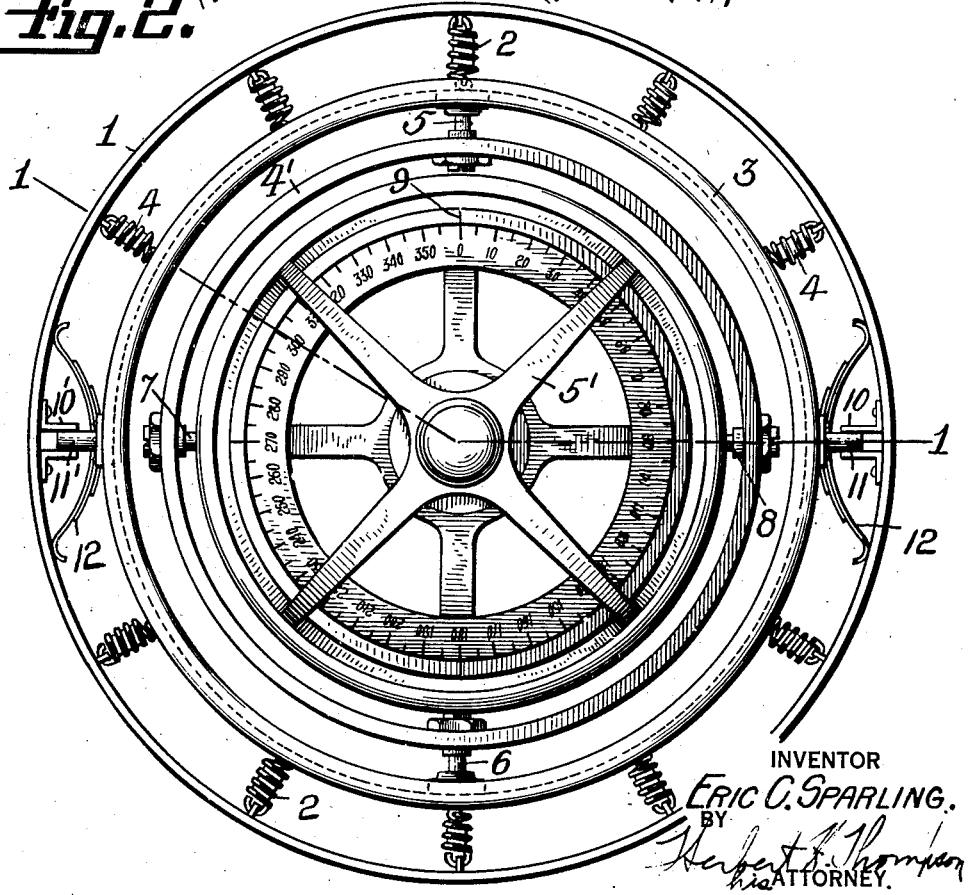
Fig. 2 is a plan view of the compass.

The compass as a whole i. e., including the compass proper and its binnacle and gimbal rings is suspended from the outer support or binnacle 1 by means of a plurality of springs 2 spaced around the interior of said binnacle 1 and extending inwardly radially and downwardly so as to be connected to the lower portion of the outer or binnacle ring 3. Said springs are damped by having friction plugs 4 inserted therein. Within the outer ring 3 the inner gimbal 4' is pivoted in the usual manner on pivot pins 5—6 and the compass spider 5' is pivoted within the gimbal 4' on pivot pins 7—8 at right angles to the pins 5—6. As stated above, while this construction is satisfactory for ordinary compass operation, it is not entirely satisfactory for accurate naval uses.

As the compass is set on the ship, the lubber's line 9 thereof is carefully aligned with the fore and aft center line of the ship and any means which would disturb this alignment would interfere with the correct reading of the compass. To preserve this alignment and at the same time permit free spring suspension within the binnacle 1, I provide a vertical guide-way 10 within the binnacle 1. Into said guide-way is shown projecting a pin 11 secured to the outer ring 3 of the compass. Said pin has a close fit within said guide-way so that turning or azimuth displacement of the ring 3 with respect to the support 1 cannot take place, and at the same time the freedom of up and down movement is not interfered with. Preferably a similar pin and slot connection 10'—11' is provided on the opposite side of the compass and additional similar connections may be provided if so desired.

I also preferably provide leaf springs 12 bearing between the inner surface of the binnacle 1 and the outer surface of the ring 3. Said springs are preferably positioned just below the pins 11—11' on both sides of the compass and serve to centralize the ring 3 within the support or binnacle 1 and prevent translatory displacement thereof. Actual trials of my invention have shown that many errors which were attributed to deviation of the compass itself were actually not compass deviations but displacements of the lubber's ring which showed up in the readings as deviations, and by my invention greatly improved results have been obtained in test trials.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A supporting means for ship's gyro compasses and the like including an exterior support, radially extending springs for supporting the compass around the inner periphery of the support, and a vertical guide between said support and the compass for maintaining the compass in a fixed position with respect of the fore and aft center line of the ship.

2. A supporting means for ship's gyro compasses and the like including an exterior support, a spring suspension for supporting the compass from its support, a vertical guide between said support and the compass for maintaining the compass in a fixed position with respect to the fore and aft center line of the ship, and additional spring means for resisting translatory movement of the compass.

In testimony whereof I have affixed my signature.

ERIC C. SPARLING.